Patented Dec. 7, 1943

2,335,845

UNITED STATES PATENT OFFICE 2,335,845

ETHERS OF POLYCHLORO-2-HYDROXY-DIPHENYL

Gerald H. Coleman and Wesley D. Schroeder, Midland, Mich., assignors to The Dow Chemical Company, Midland, Mich., a corporation of Michigan No Drawing. Application October 24, 1941, Serial No. 416,368

2 Claims. (Cl. 260—612)

The present invention relates to a group of new compounds consisting of ethers of polychloro-2-hydroxy-diphenyl and is particularly directed to compounds having the following formula:

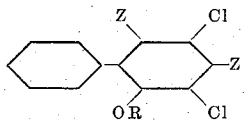

wherein one Z represents hydrogen, the other Z represents hydrogen or chlorine, and R represents an alkenyl, alkyl, alkoxy-alkyl, halo-alkoxy-alkyl, cycloalkyl, or aralkyl radical. Representative members of this group of compounds have been prepared and found to be relatively high boiling liquids or low melting crystalline solids, substantially insoluble in water and somewhat soluble in many organic solvents. These compounds are valuable as insecticidal toxicants and as modifiers for plastic compositions.

In preparing the new compounds a polychloro-2-hydroxy-diphenyl, such as 3.5-dichloro-2-hydroxy-diphenyl or 3.5.x-trichloro-2-hydroxy-diphenyl is reacted with a suitable etherifying agent in the presence of an alkali metal hydroxide. The reaction is preferably carried out in the presence of water or alcohol and at a somewhat elevated temperature above 50° C. and below the decomposition temperature of the reaction mixture. The etherifying agent employed is preferably an organic halide or an organic sulfate. Substantially equimolecular proportions of such etherifying agent and phenol have been found to give the desired ether compounds in good yield. The amount of alkali metal hydroxide employed is generally somewhat in excess of the molecular proportion of phenol present in the reaction mixture.

When the etherification is complete, the reaction mixture may be cooled to room temperature, the crude ether product separated by extraction with a suitable solvent such as benzene, and the extract fractionally distilled. The ether of the polychloro-2-hydroxy-diphenyl may be obtained thereby as a substantially pure product. When the crude reaction product is a solid, an alternate purification method consists of fractionally crystallizing the reaction mixture from a suitable organic solvent such as petroleum ether, carbon tetrachloride, or alcohol.

The following examples are illustrative of the invention but are not to be construed as limiting the same:

*Example 1*

95.6 grams (0.4 mol) of 3.5-dichloro-2-hydroxy-diphenyl, 20 grams (0.5 mol) of sodium hydroxide, and 400 milliliters of water were stirred together to obtain a solution of the sodium salt of the phenol. This product was cooled to 15° C. and 50.4 grams (0.4 mol) of dimethyl sulfate added portionwise thereto over a period of 30 minutes with stirring. The mixture was thereafter warmed at temperatures increasing from 45° to 100° C. for 3 hours. The resulting crude oily product was separated, washed with water, and fractionally distilled to obtain 58 grams of the methyl ether of 3.5-dichloro-2-hydroxy-diphenyl boiling at 127°–129° C. at 1 mm. pressure and having a melting point of 68°–70° C. This product contained 27.9% chlorine by analysis compared to a theoretical content of 28.08. The new ether compound was somewhat soluble in kerosene, carbon tetrachloride, and alcohol, and substantially insoluble in water.

*Example 2*

In a similar manner 0.2 molar proportions of 3.5.$x$-trichloro-2-hydroxy-diphenyl and diethyl sulfate were reacted together in the presence of 0.3 mol of sodium hydroxide in 100 milliliters of water. The reaction mixture was heated at 80°–90° C. for 15 hours and thereafter cooled to obtain a solid product of reaction which was fractionally recrystallized from petroleum ether to obtain 28 grams of the ethyl ether of 3.5.$x$-trichloro-2-hydroxy-diphenyl as a white crystalline compound melting at 61°–63° C. This product was somewhat soluble in kerosene, carbon tetrachloride, and 95% ethanol, and substantially insoluble in water.

*Example 3*

Likewise 0.2 molar quantities of 3.5.$x$-trichloro-2-hydroxy-diphenyl and dimethyl sulfate were reacted together in the presence of a slight excess of sodium hydroxide dissolved in 100 milliliters of water. The crude reaction product was recrystallized from alcohol to obtain 34.5 grams of the methyl ether of 3.5.$x$-trichloro-2-hydroxy-diphenyl as a white crystalline compound melting at 77°–79° C. This compound was somewhat soluble in kerosene, carbon tetrachloride, and 95% ethanol, and substantially insoluble in water.

*Example 4*

54.7 grams (0.2 mol) of 3.5.$x$-trichloro-2-hydroxy-diphenyl, 10 grams of sodium hydroxide dissolved in 50 milliliters of water, and 22 grams of normalbutyl chloride were mixed together and heated to 110°–120° C. in a pressure reactor and under autogenous pressure for 6 hours. The crude reaction mixture was then washed with dilute aqueous alkali, extracted with carbon tetrachloride, and the extract fractionally distilled. 23.5 grams of the normalbutyl ether of 3.5.$x$-trichloro-2-hydroxy-diphenyl was thereby obtained as a viscous liquid boiling at 177°–178° C. at 1.5 mm. pressure and having a specific gravity of 1.266 at 25°/25° C. This compound was somewhat soluble in 95% ethanol, kerosene, and carbon tetrachloride, and substantially insoluble in water.

*Example 5*

54.7 grams (0.2 mol) of 3.5.$x$-trichloro-2-hydroxy-diphenyl and 65 grams of β-β'-dichloro-diethyl-ether were mixed together and a solution of 8 grams of sodium hydroxide in 10 milliliters of water added portionwise thereto over a period of 20 minutes with stirring. The mixture was heated at 90°–95° C. for 24 hours and thereafter extracted with diethyl-ether. The ether extract was fractionally distilled to obtain 10.5 grams of the β-(2-chloro-ethoxy)-ethyl ether of 3.5.$x$-trichloro-2-hydroxy-diphenyl boiling at 232°–235° C. at 2 mm. pressure and having a melting point of 71°–72.5° C. This compound was somewhat soluble in kerosene, 95% ethanol, and carbon tetrachloride and substantially insoluble in water.

*Example 6*

54.7 grams (0.2 mol) of 3.5.$x$-trichloro-2-hydroxy-diphenyl was dissolved in 75 milliliters of 95% ethanol, 20 grams (0.2 mol) of crude allyl chloride, and 8.8 grams of sodium hydroxide dissolved in 25 milliliters of water were added alternately and in small portions to the alcoholic solution over a period of 2–3 hours. The crude reaction product was then diluted with water, extracted with benzene and the benzene extract fractionally distilled to obtain 14 grams of the allyl ether of 3.5.$x$-trichloro-2-hydroxy-diphenyl as a viscous liquid boiling at 206°–209° C. at 4 mm. pressure, and having a specific gravity of 1.386 at 25°/25° C. This product was somewhat soluble in kerosene, carbon tetrachloride, and 95% ethanol and substantially insoluble in water.

In a similar manner other etherifying agents may be substituted for those shown in the examples to obtain such compounds as the isopropyl, tertiaryoctyl, n-butenyl, β-ethoxy-ethyl, β-n-butoxy-ethyl, β-propoxy-propyl, gamma-(3-chloro-propoxy)-propyl, β-(2-bromo-ethoxy)-ethyl, cyclohexyl, 4-methyl-cyclohexyl, benzyl, β-phenyl-ethyl, and β-naphthyl-ethyl ethers of 3.5-dichloro-2-hydroxy-diphenyl and 3.5.$x$-trichloro-2-hydroxy-diphenyl.

Representative compounds of the group set forth above have been found to have value in insecticidal compositions. In such application they may be employed in combination with any suitable inert diluent and/or known insecticidal toxicant material. A composition comprising 2.5 grams of the methyl ether of 3.5.$x$-trichloro-2-hydroxy-diphenyl, 5 milliliters of methyl-ethyl ketone, 50 milligrams of pyrethrum, and sufficient of a light petroleum distillate to give a total volume of 100 milliliters has been found to give a kill against houseflies of 88.4 per cent in 24 hours. The procedure followed in determining the toxicity of the composition was substantially that disclosed in Soap 8, No. 4, 1932 and known as the Peet-Grady method.

The 3.5.$x$-trichloro-2-hydroxy-diphenyl employed as a starting material in the preparation of certain of the ethers set forth in the foregoing examples was prepared by reacting 2-hydroxy-diphenyl with gaseous chlorine. In a representative preparation 0.5 mol of 2-hydroxy-diphenyl was dissolved in 45 milliliters of tetrachloroethylene and the solution heated to 90°–95° C. Chlorine gas was passed through the phenol solution at this temperature until the amount of hydrogen chloride evolved indicated the reaction of 3 mols of chlorine. The crude reaction product solidified upon cooling, and was dissolved in hot petroleum ether and recrystallized. After several recrystallizations there was obtained a 49 per cent yield of 3.5.$x$-trichloro-2-hydroxy-diphenyl as a white solid melting at 117°–118.5° C. This compound was substantially insoluble in water, slightly soluble in kerosene, and somewhat soluble in carbon tetrachloride and 95 per cent ethyl alcohol. Upon analysis, the phenol was found to contain 38.95 per cent chlorine as compared to a theoretical chlorine content of 39 per cent. The position of the third chlorine atom in the hydroxylated benzene ring was determined by the oxidation of the compound to form benzoic acid.

We claim:
1. 2-alkoxy-3.5-dichloro-diphenyl.
2. 2-methoxy-3.5-dichloro-diphenyl.

GERALD H. COLEMAN.
WESLEY D. SCHROEDER.